Dec. 3, 1968   O. J. SCHWERTFEGER ET AL   3,413,907
INFUSOR APPARATUS
Filed March 30, 1965   4 Sheets-Sheet 1

INVENTORS.
OWEN J. SCHWERTFEGER
FRANK D. BRILL
BY
ATTY

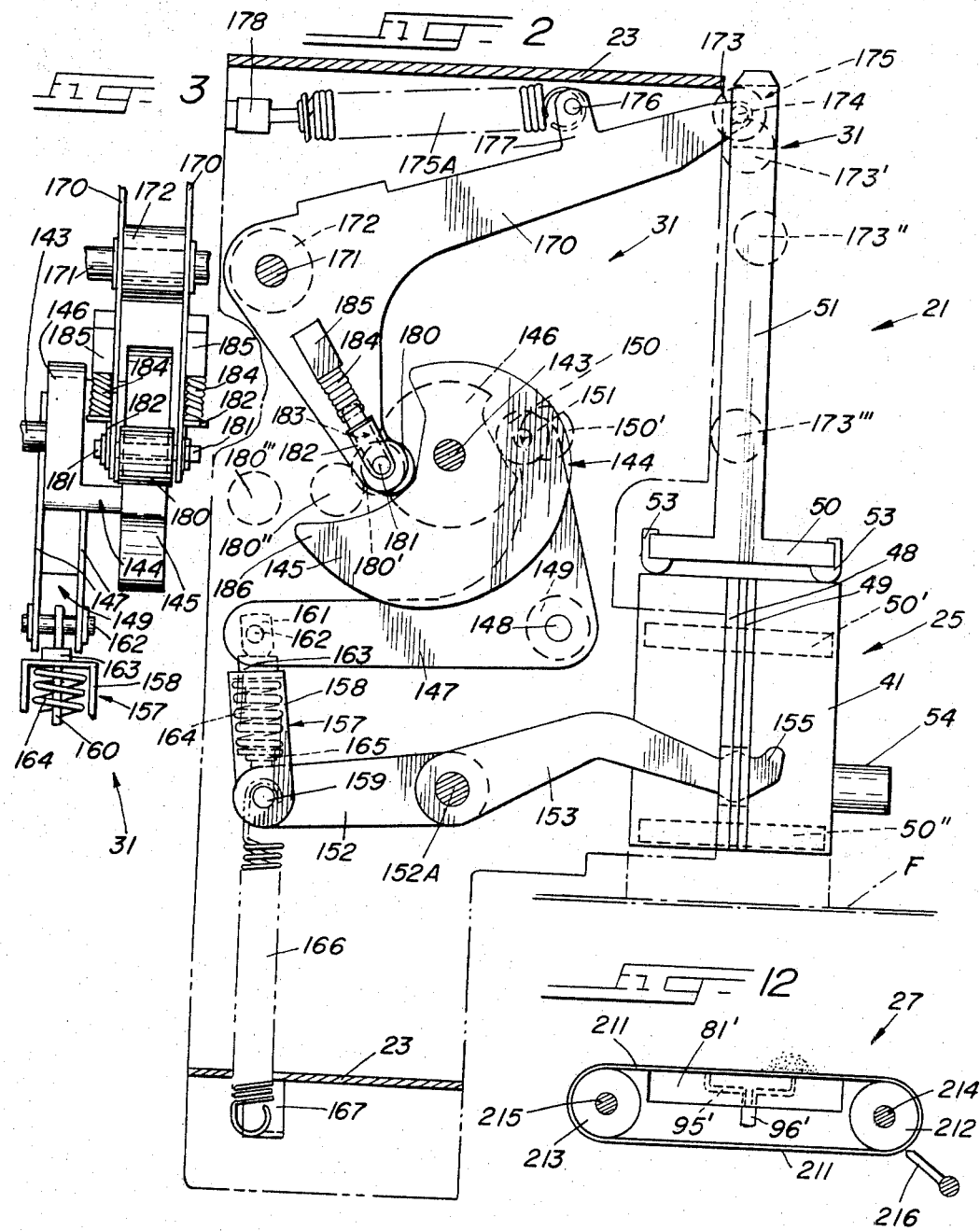

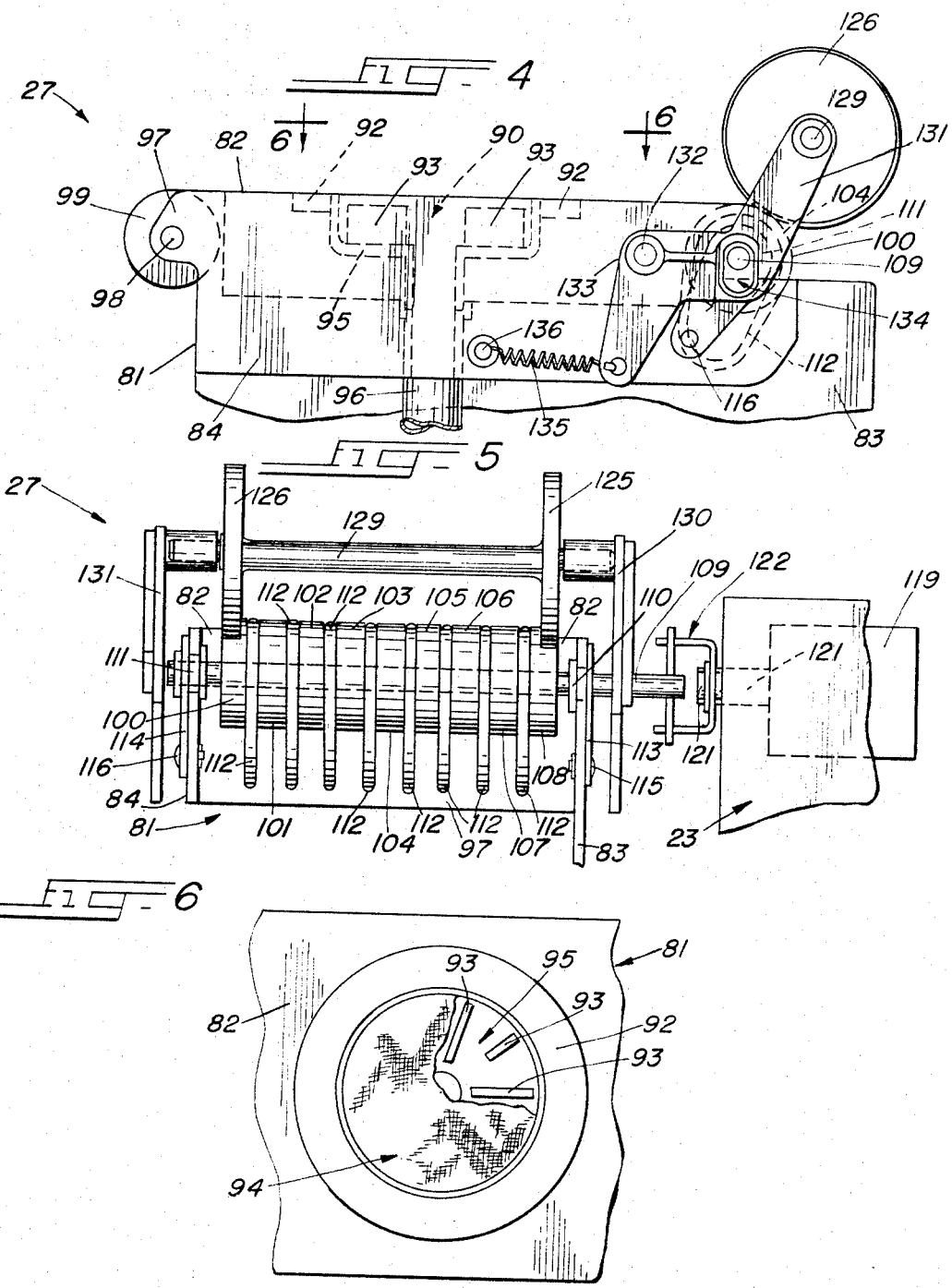

Dec. 3, 1968   O. J. SCHWERTFEGER ETAL   3,413,907
INFUSOR APPARATUS
Filed March 30, 1965   4 Sheets-Sheet 4
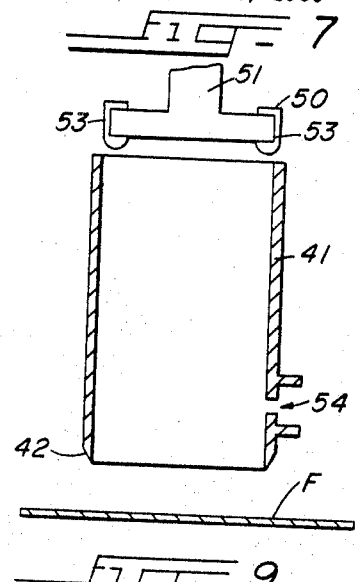
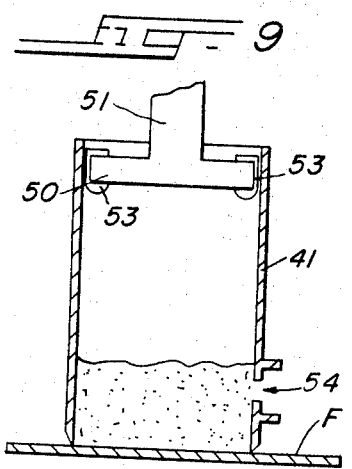
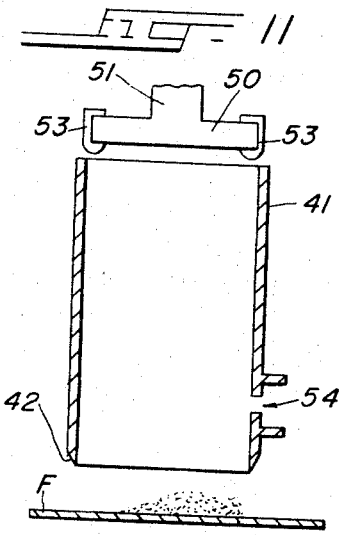
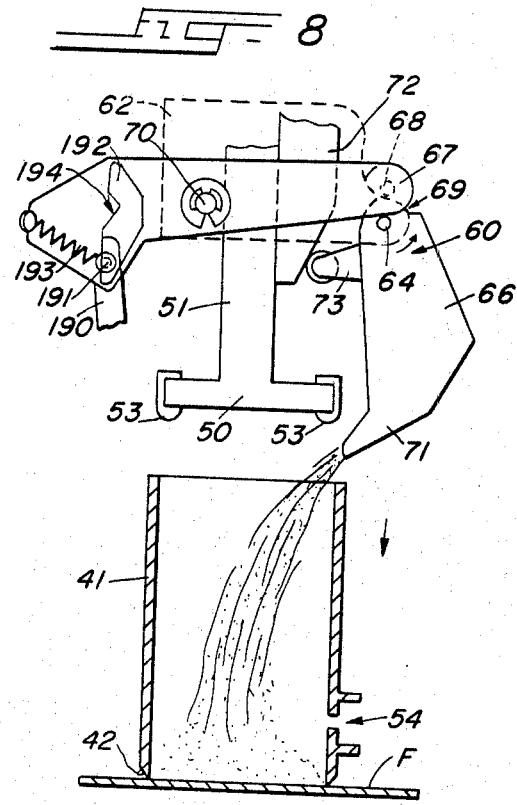
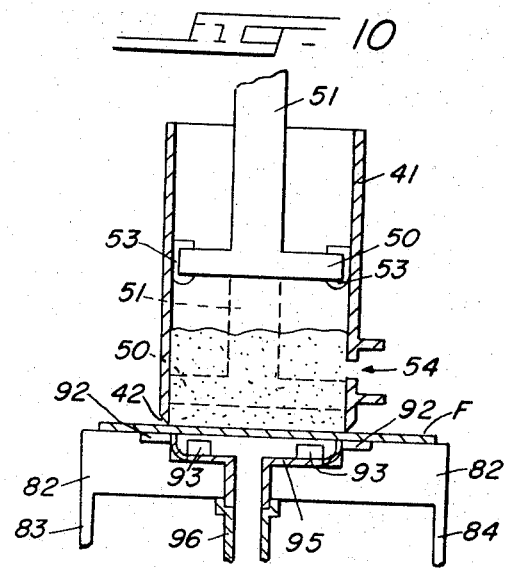
INVENTORS.
OWEN J. SCHWERTFEGER
FRANK D. BRILL
BY

United States Patent Office 3,413,907
Patented Dec. 3, 1968

3,413,907
INFUSOR APPARATUS
Owen J. Schwertfeger, Chicago, and Frank D. Brill, Norridge, Ill., assignors to The Seeburg Corporation, Chicago, Ill., a corporation of Delaware
Filed Mar. 30, 1965, Ser. No. 443,786
12 Claims. (Cl. 99—287)

ABSTRACT OF THE DISCLOSURE

An improved one cup coffee brewing mechanism comprises a brewing chamber having a coffee outlet opening and filter means in cooperation therewith. Means are provided for placing a charge of ground coffee in the chamber, and the device further includes means for sealing the ground coffee within the chamber and liquid supply means adapted to inject a jet stream of water into the ground coffee so as to cause vigorous agitation thereof. Pressurizing means simultaneously increases pressure within the chamber such that the ground coffee is rapidly and thoroughly infused with the heated water and the resulting brewed coffee is discharged from the outlet opening of the chamber through the filter means.

---

This invention relates to the infusor art and more particularly to a coffee brewer and vendor which is especially adapted for a one-cup cycle characterized by a rapid and highly effective brewing and filtering operation, in which the spent coffee grounds are left in substantially dry condition for facilitated disposal thereof.

The quest for a satisfactory coffee brewing machine has involved a major area of research in the vending industry. This quest has developed a large number of different approaches. The ultimate objective, of course, is to obtain a machine capable of producing coffee having the flavor, aroma, and appearance of coffee freshly brewed from grounds. It has been found that coffee brewed in large batches and maintained in storage tanks for subsequent dispensing soon loses the aroma and flavor of freshly brewed coffee. Consequently, an apparatus was sought which could freshly brew coffee in small quantities, such as by the cup. However, the relatively long natural brew time (e.g., several minutes) in conventional one-cup brewers has been commercially objectionable.

The development of powdered instant coffees led to the development of coffee brewing machines capable of preparing coffee by the cup in a very short time (i.e., in a few seconds). Such coffee brewing machines, nevertheless, have not provided the ultimate approach, since coffees brewed from heretofore available instant powders lack the full-bodied aroma and excellence of flavor of coffee freshly brewed from grounds and moreover tend to be frothy or foamy.

Attempts to shorten the natural brewing time through the use of finely ground coffee, rather than instant coffee powder, have resulted in the provision of a "hybrid" coffee that is better than instant coffee but that still lacks the desired characteristics of naturally brewed coffee. Such "hybrid" coffees have had the additional disadvantage of a sediment of finely divided coffee particles settling in the drinking cup.

More recent attempts to provide an optimum coffee brewer suitable for commercial vending purposes have involved the utilization of filters or strainers to separate the finely divided insoluble material from the coffee prior to its dispensation. In order to maintain as short a brew time as possible, it is necessary to utilize pressure to force the brewed coffee through the filter or strainer (as opposed to mere gravitational filtering). One common arrangement uses a mixture of hot water and steam to force the rapidly brewed coffee through the filter or strainer. However, these single cup brewing machines have the disadvantage of leaving a moist mixture of insoluble coffee grounds and sedimentary material on the filter or strainer. Thus, storage means for collecting the wet waste material must be provided, thereby greatly complicating machine servicing and maintenance problems. Moreover, although such machines have relatively short brewing times, the rapid operation is obtained only by sacrificing the quality of the coffee produced (i.e., the coffee lacks the desired strength and full-bodied character of naturally brewed coffee).

In accordance with the subject invention, a one-cup coffee brewing technique has now been developed which is capable of brewing coffee having highly desirable flavor, aroma, and appearance, and which has none of the disadvantages inherent in the devices heretofore known. Thus, the coffee produced is similar to naturally brewed coffee yet the brewing time is amazingly short. Moreover, the mess or inconvenience caused by the retention of wet coffee grounds and soggy filters, which has characterized certain of the previously known coffee brewing machines, has been obviated.

The new coffee brewing technique comprises a first step of disposing a predetermined charge of ground coffee on a filter medium within a brewing chamber. A next step involves injection into the brewing chamber of a predetermined volume of heated water in a jet stream in order to vigorously agitate the ground coffee. Simultaneously with the injection of water, pressure is developed within the brewing chamber, and pressure development continues after the injection of water is stopped. Utilization of this method produces a coffee which is rapidly brewed within the chamber and is forced through the filter medium, leaving relatively dry grounds residue thereon.

The subject invention also provides a one-cup coffee brewing mechanism adapted to utilize the described coffee brewing technique. The mechanism comprises a brewing chamber having a coffee outlet opening and a water ingress opening adjacent the outlet opening. A movable filter member is provided, and the brewing chamber is movable between a first position, wherein it is disposed away from the filter member, and a second position, wherein it clamps against the filter member. Drive means are provided for moving the chamber between its first and second positions, and means are provided for supplying a predetermined charge of ground coffee into the brewing chamber after the chamber has moved from its first to its second position. An important advantage of the invention is obtained through the provision of water supply means adapted to inject a predetermined volume of heated water in a pressurized jet stream through the water ingress opening into the brewing chamber and to direct the said stream at the charge of ground coffee positioned on the filter medium. Means are provided for producing pressure within the brewing chamber by reducing the effective volume thereof simultaneously with the injection therein of the stream of heated water, whereby coffee is rapidly brewed within the chamber and is forced therefrom through the filter member. The simultaneous exertion of pressure and the agitation of the coffee grounds by the injected water produces a brewed coffee with highly desirable characteristics in an unexpectedly short time.

In a preferred embodiment of the brewing mechanism, the brewing chamber comprises a cylinder having an open bottom and an open top and being adapted for reciprocal movement relative to a brewing drain base. Pressure is produced in the chamber by a piston which is movable: from a first standby position wherein the piston is disengaged from the cylinder; to a second position wherein the piston seals the open top of the cylinder; to a third position wherein the piston is disposed adjacent the open bottom of the chamber which is clamped over the filter member, the movement of the piston from the second to the third position being effective to continually increase the pressure in the cylinder; and back to its first position. The piston moves from its second to its third positions simultaneously with the injection of the heated water stream. However, injection of the water stops prior to the piston reaching its third position so that brewed coffee is forced through the filter member and the grounds dried as will hereinafter be explained.

The subject invention also comprises a novel synchronized unitary drive mechanism for the preferred embodiment whereby a single motor-driven cam mechanism controls the movement of the brewing chamber and of the piston, whereby insuring a reliable and controlled brewing cycle.

The pressure developed within the brewing chamber forces the brewed coffee through the filter member disposed at the bottom of the brewing chamber. Pressure is produced in the chamber even after the injection of water has stopped, so that all of the liquid is forced from the chamber, and the remaining used coffee grounds are dried by the passage therethrough of air compressed within the brewing chamber. Consequently, after the movable brewing chamber is returned to its raised position, the filter member may be advanced, and a fresh filter member may be positioned under the brewing chamber. The dry coffee grounds and the used filter member are collected in a convenient waste receptacle. Thus, the subject invention involves none of the inconvenience associated with devices that have wet coffee grounds and moist filters or strainers remaining at the end of the brewing cycle.

A filter tape, led from a storage roll, may be used as the filter member. If such an arrangement is utilized, the used filter tape, together with the dry grounds, is collected in a waste receptacle. However, since the subject invention provides a relatively dry grounds brewer (i.e., substantially no wet waste material remains after completion of the brewing cycle), an endless filter belt may be utilized instead of the filter tape. In connection with such an arrangement, means are provided for scraping the dry grounds from the filter belt as it advances away from the brewing chamber.

It is a primary object of the present invention to provide a device for freshly brewing single cups of full-bodied coffee having an excellent aroma, flavor, and appearance.

Another object of the present invention is to provide a device of the character described wherein the entire brewing cycle takes only a few seconds.

Still another object is to provide a device of the character described wherein substantially no wet or moist waste materials are produced.

A further object is to provide a device of the character described wherein the brewed coffee is filtered through a filter medium prior to the completion of the brewing cycle.

A still further object is to provide a device of the character described wherein a movable filter tape is utilized as the filter medium, the filter tape being advanced after the completion of each brewing cycle.

An alternative object of the present invention is to provide a device of the character described wherein an endless filter belt is utilized in place of the filter tape as the filter medium, and wherein means are provided for scraping the dry coffee grounds from the filter belt.

Another object of the present invention is to provide a reliable and simplified synchronized unitary drive mechanism adapted to actuate a one-cup coffee brewer of the character described according to a predetermined brewing cycle.

Still another object is to provide a drive mechanism of the character described wherein built-in stress-relieving means is incorporated.

A further object of the subject invention is to provide a novel coffee brewing method according to which a jet stream of hot water is directed at a charge of coffee grounds disposed in a brewing chamber, and simultaneously pressure is exerted in the chamber, causing rapidly brewed coffee to be forced through a filter medium.

These and other objects, advantages, and features of the present invention will hereinafter appear, and, for purposes of illustration, but not of limitation, an exemplary embodiment of the present invention is shown in the accompanying drawings, in which:

FIGURE 2 is a left side elevational view of the embodiment shown in FIGURE 1 with parts removed to reveal the brewer drive mechanism;

FIGURE 3 is a fragmentary rear elevational view of portions of the brewer drive mechanism;

FIGURE 4 is an enlarged fragmentary front elevational view showing a filter drive mechanism;

FIGURE 5 is a right side elevational view of the mechanism shown in FIGURE 4;

FIGURE 6 is a fragmentary top plan view of the mechanism shown in FIGURE 4, with the filter medium removed and with portions of the mechanism cut away to exhibit internal details;

FIGURE 7 is a schematic left side elevational view of the coffee brewing components of the embodiment shown in FIGURE 1, as disposed in a rest position;

FIGURE 8 is a similar view during a first stage of the brewing cycle;

FIGURE 9 is a similar view during a second stage of the brewing cycle;

FIGURE 10 is a similar view during a third stage of the brewing cycle;

FIGURE 11 is a similar view after completion of the brewing cycle; and

FIGURE 12 is a front elevational view of a modified filter drive arrangement.

Figure 1:
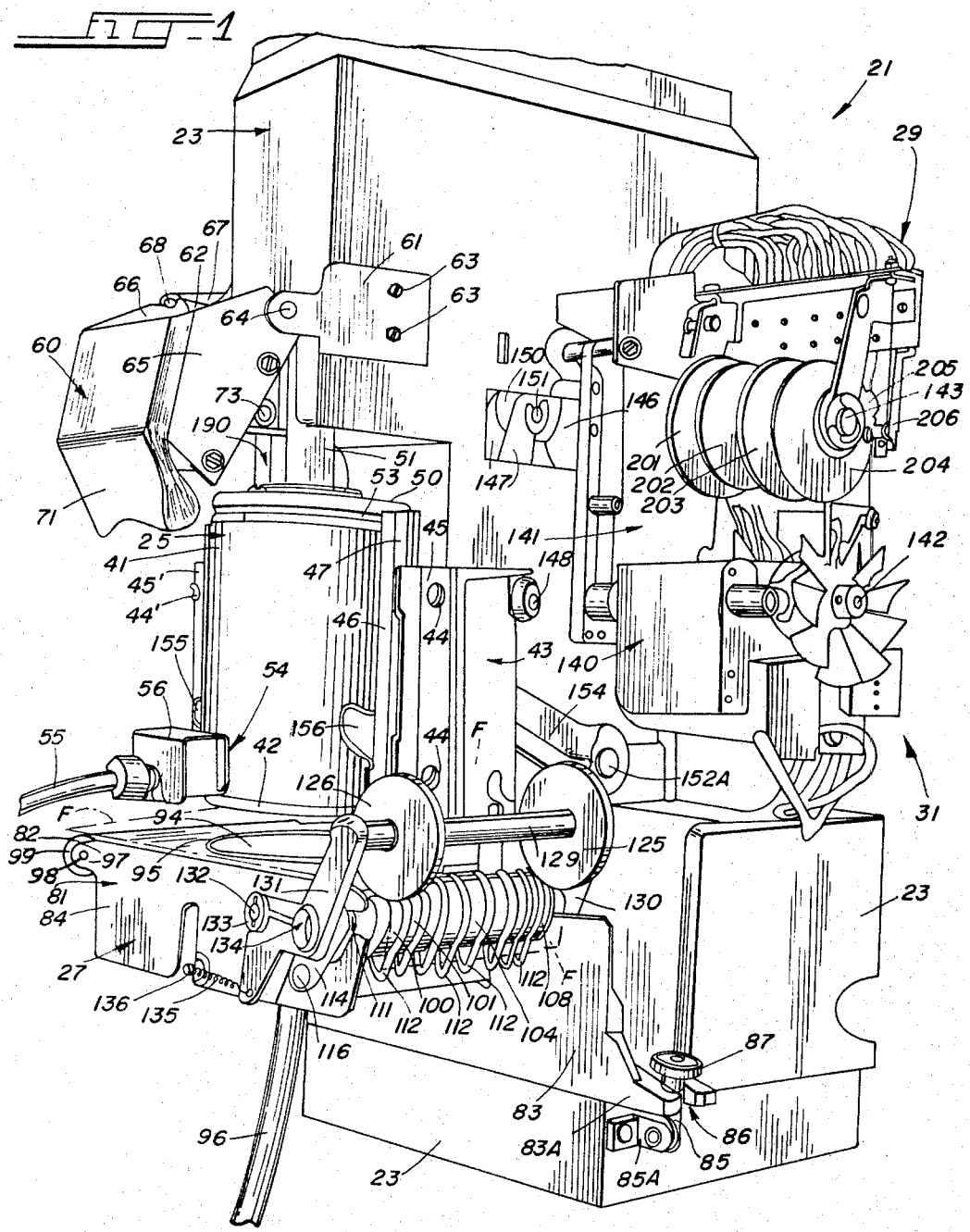
FIGURE 1 is a perspective view of one embodiment of the present invention.

With reference to the drawings, FIGURE 1 shows a one-cup coffee brewer 21 comprising a mechanism frame 23, a brewer assembly 25, a filter transport assembly 27, and a cycle control assembly 29. A unitary drive assembly 31, which is generally disposed within frame 23, is shown more clearly in FIGURES 2 and 3, although parts thereof may be seen in FIGURE 1.

Brewer assembly 25 comprises a generally cylindrical brewing chamber 41 which is open at its bottom and top, the bottom edge 42 of chamber 41 being beveled to a knife edge for reasons that will hereinafter appear. A supporting flange 43 on frame 23 has an L-shaped member 45 mounted thereon by bolts 44. L-shaped member 45 has a groove (not visible in the drawing) formed therein. A runner 46, fixed to chamber 41 by convenient means (not shown), has a tongue 47 formed thereon, and tongue 47 is adapted to fit into the groove in L-shaped member 45 such that runner 46 is rendered vertically slidable with respect to L-shaped member 45.

A supporting flange (not shown) similar to flange 43 is formed on the other side of chamber 41 and another L-shaped member 45′, with a groove (not shown) formed therein, is fixed to the second supporting flange by a bolt 44′ and another bolt (not shown). A second runner 48 (see FIGURE 2), similar to runner 46 is fixed on the opposite side of chamber 41, and a tongue 49 on the second runner 48 engages the groove in the L-shaped member 45′ and is vertically slidable therein. Thus, chamber 41 is vertically slidable between a lowered and a raised position, with tongues 47, 49 sliding in the corresponding grooves. The method of imparting vertical movement to chamber 41 will hereinafter appear.

A piston 50 is fixedly mounted on a piston shaft 51 in a conventional manner, and piston 50 is adapted to slide within chamber 41 between the positions schematically shown in FIGURES 7 through 11. An annular sealing gasket 53 is provided on the piston 50 so that an airtight seal is formed between piston 50 and chamber 41 as piston 50 slides downwardly within chamber 41. The upper end of piston shaft 51 slidably moves in a pair of conventional bearing guides (not shown) disposed inside the mechanism frame 23.

A water ingress port 54 is provided adjacent the lower edge of chamber 41, and a water supply tube 55, leading from a water pump (not shown), is connected to ingress port 54 by a conventional coupling 56. The water pump is adapted upon actuation to supply under pressure a predetermined volume of heated water for injection in a jet stream into the lower portion of chamber 41. Water ingress port 54 is smaller in diameter than the supply tube 55, thereby contributing to the injection pressure. Preferably, a check valve (not shown) is provided adjacent connection 56 in order to prevent water from flowing back from chamber 41 through tube 55 to the water pump when pressure is produced within chamber 41 as hereinafter described. Tube 55 is flexible so that reciprocal vertical movement of chamber 41 does not damage tube 55.

The provision of water ingress port 54 adjacent the lower edge of chamber 41 is an important feature of the subject invention. With port 54 disposed adjacent the bottom thereof, a jet stream of heated water can be injected into chamber 41 in a manner adapted to vigorously agitate a charge of ground coffee positioned at the bottom thereof. As will hereinafter appear, it is the injection of a jet stream of pressurized heated water simultaneously with an increase in pressure within chamber 41, (resulting from a decrease in the volume of chamber 41 due to downward movement of piston 50) which enables a coffee of excellent characteristics to be brewed in a remarkably short period of time. The importance of port 54 being disposed adjacent the bottom of chamber 41 lies, therefore, not only in the more efficient agitation of the ground coffee which results, but also in the fact that piston 50 may be moved downwardly within chamber 41 at the same time the jet stream of water is injected. Thus, the provision of port 54 adjacent the lower edge of chamber 41 makes the desired simultaneous injection of water and increase in pressure possible.

Brewer assembly 25 further comprises a coffee transfer chute 60. A pair of brackets 61, 62 are respectively mounted on the right and left sides of mechanism frame 23 by suitable means such as bolts 63. A pivot pin 64 passes rotatably through a side 65 and a side 66 of chute 60 and is anchored in brackets 61, 62. Chute 60 is pivotable between a raised position corresponding to that shown in FIGURE 1 and a lowered position corresponding to that shown in FIGURE 8. With chute 60 disposed in its FIGURE 8 position, a charge of ground coffee may be released from a coffee dispenser (not shown) into chute 60, so that a chute spout 71 formed along the bottom edge of chute 60 may direct the charge of coffee into chamber 41 via the open top thereof. Chute 60 is normally locked in its raised position by means of a chute locking lever 67 (see FIGURE 8), a stud 68 on which engages a notch 69 in side 66 of chute 60. Lever 67 is pivoted to bracket 62 by means of a pivot pin 70 (bracket 62 is not shown in FIGURE 8). Counterclockwise rotation of locking lever 67 (as seen in FIGURE 8) about pivot pin 70 causes stud 68 to move out of notch 69, thereby permitting chute 60 to pivot about pin 64 to its lowered position.

Means are also provided for returning the chute 60 to its raised position after the charge of ground coffee has been introduced into the chamber 41. This is accomplished by providing a cam surface 72 (see FIGURE 8) on piston shaft 51. A roller-follower 73 is fixed between sides 65 and 66 of chute 60 by conventional means. Roller-follower 73 is adapted to engage cam surface 72 upon downward movement of piston shaft 51 whereby chute 60 is pivoted upwardly to its raised position. Cam surface 72 on piston shaft 51 is not visible in FIGURE 1 since piston shaft 51 is withdrawn inside mechanism frame 23. However, surface 72 is schematically shown in FIGURE 8. The manner in which chute 60 is relocked will hereinafter be explained.

As has hereinbefore been indicated, coffee dispensing means (not shown) is provided above chute 60. It will be obvious to one skilled in the art that a metering device adapted to release a predetermined measured amount of ground coffee into chute 60 may be provided in association with the coffee dispensing means. As will hereinafter be seen, the cycle control assembly 29 is adapted to activate such a metering device during the period that the chute 60 is disposed in its FIGURE 8 disposition so that the coffee is released into chamber 41. Furthermore, the charge of coffee will have been completely delivered into chamber 41 prior to the engagement of roller-follower 73 with cam surface 72, and hence chute 60 will be returned to its FIGURE 1 disposition only after the charge of coffee has completely been delivered into chamber 41.

Filter transport assembly 27 is illustrated in detail in FIGURES 4–6 and also partially in FIGURES 7–11. The function of assembly 27 is to support and advance a filter medium F, in the form of either an endless belt or a tape from a continuous roll, beneath the lower end of chamber 41. A base casting 81 comprises a generally planar top plate 82 and side walls 83, 84. Side wall 83 of casting 81 is mounted on mechanism frame 23 by conventional means such as a threaded fastener 85, which is pivoted to a bracket 85A on mechanism frame 23, and which passes through a slot 86 in a projecting flange 83A on side wall 83 (see FIGURE 1), and a nut 87 which is threadable onto fastener 85. Similar conventional mounting or attaching means (not shown) is provided at the left end of side wall 83 (as viewed in FIGURES 1 and 4.)

An opening 90 (see FIGURE 4) is provided in top plate 82 in order to support a semiflexible gasket 92 (see FIGURES 4 and 6) and a drain cup 95 (see FIGURES 4 and 10). Drain cup 95 is provided with a plurality of radial supporting grids 93, which cooperate with the outer rim of cup 95 to support a fine mesh screen 94 (see FIGURE 6). The screen 94 preferably is formed of stainless steel mesh, although cloth screens may also be utilized.

Filter transport assembly 27 is thus designed so that coffee freshly brewed in brewing chamber 41 passes downwardly through the filter medium F, which is disposed over screen 94 and grids 93, into drain cup 95, and out through a delivery tube 96 which leads to a beverage delivery area (not shown). It will be obvious to one skilled in the art that in such a beverage delivery area, receptacle means such as a hot drink cup (not shown) may be disposed under an outlet spout leading from delivery tube 96, whereby the hot drink cup can be filled with freshly brewed coffee for manual pickup by a customer.

Roller means are provided at each end of base casting 81 in order to permit the filter medium F to be smoothly drawn over drain cup 95 in top plate 82. A projection 97 is provided on side wall 84 of casting 81, and a similar projection (not shown) is provided on side wall 83. A shaft 98 is journaled for rotation in the projections and a roller 99 is mounted on shaft 98 whereby when a filter medium F is passed thereover, roller 99 rotates with medium F so as to facilitate the passage thereof.

A drive shaft 109 is rotatably journaled in a pair of bearings 110, 111 which float respectively in a slot 112 in side wall 84 (see FIGURE 4) and a similar slot (not shown) in side wall 83. Each of the bearings 110, 111 has an arm 113, 114 which projects downwardly on the outside of respective side walls 83, 84, arm 113 being fixed to side wall 83 by means of a bolt 115 and arm 114 being fixed to side wall 84 by means of a bolt 116. As is schematically shown in FIGURE 5, a motor 119 is attached to mechanism frame 23 by conventional means (not shown). Motor shaft 121 is linked to drive shaft 109 by means of a universal coupling 122, whereby shaft 109 is rotated by motor 119.

A plurality of rollers 100–108 are mounted on shaft 109 for rotation therewith. The filter medium F is passed over rollers 100–108 which thus serve to facilitate the passage thereof.

A pair of friction rollers 125, 126 are mounted on a shaft 129. A pair of Z-shaped mounting arms 130, 131 are provided, one being mounted at each end of shaft 129. Arm 131 is pivoted to base casting 81 by means of a pivot pin 132 on side wall 84 and a retaining ring 133. Arm 130 is pivoted to side wall 83 in a similar manner. An opening 134 is provided in arm 131, and a similar opening (not shown) is provided in arm 133 so that the ends of shaft 109 do not impede pivotal movement of arms 130, 131. A spring 135 is stretched between the lower leg of arm 131 and a projecting pin 136 on side wall member 84, and a similar spring (not shown) is stretched between the lower leg of arm 130 and a projecting pin (also not shown) on side wall 84. Thus, arms 130, 131 are biased to pivot in a clockwise direction (as seen in FIGURE 4) so that rollers 125, 126 contact the filter drive rollers 100, 108. When filter medium F is threaded between friction rollers 125, 126 and drive rollers 100, 108, the rollers 125, 126 maintain the filter medium in non-slipping engagement with the drive rollers 100, 108, whereby the rotation of shaft 109 by motor 119 results in filter medium F being drawn over top plate 82. The operation of motor 119 is controlled in a manner that will hereinafter be described.

A plurality of spring members 112 (see especially FIGURES 4 and 5) are provided between the rollers 100–108. The small amount of residual moisture remaining in the filter medium after the brew cycle causes the medium to tend to adhere to the rollers, and thus the medium has a tendency to "curl" under with the rollers as they are rotated by motor 119. Thus, spring members 112 are provided in order to prevent the curling under of the filter medium F.

In the operation of the one-cup coffee brewer 21, it is contemplated that, after the brewing of each cup of coffee, the filter medium F (shown in broken lines in FIGURE 2) will be advanced beneath the lower end of brewing chamber 41. The brewer 21 is designed so that the filter medium F which is utilized may be drawn from a continuous roll over roller 99, top plate 82, between rollers 100–108 and 125, 126, and over spring members 112, and thence to a waste receptacle.

It is also possible to utilize the filter medium F in the form of an endless belt. However, as will hereinafter be made clear, if the endless belt arrangement is utilized, certain structural modifications in the filter transport assembly 27 are necessary (see FIGURE 12). It will be obvious to one skilled in the art that, in addition, the filter medium F will be made of a more durable filtering material if the endless belt modification is adopted. However, the one-cup coffee brewing machine functions in the same general manner in either case.

Unitary drive assembly 31 is best seen in FIGURES 1–3. A motor 140 is fixed to a conventional gear box 141 (see FIGURE 1), and gear box 141 is mounted on mechanism frame 23 in a conventional manner. Motor 140 and cycle control assembly 29 are normally protected by a cover shield which has been removed from the machine shown in FIGURE 1 for purposes of illustrational clarity. Motor 140 is provided with a drive shaft 142 which is operatively connected with gear box 141, and an actuating shaft 143 (see FIGURES 1–3) passes through gear box 141 and extends outwardly from each side thereof. Motor 140, when energized, imparts rotational movement to actuating shaft 143 by means of gear box 141 and drive shaft 142.

A drive cam 144 is mounted on shaft 143 within mechanism frame 23 (see FIGURES 2 and 3). Cam 144 comprises a piston drive cam profile 145 and a chamber drive cam profile 146. Motor 140 is designed to operate so that shaft 143 turns cam 144 in a counterclockwise direction (as seen in FIGURE 2). A pair of L-shaped arms 147 are mounted about a pivot shaft 148 with a cylindrical spacer 149 separating arms 147. A roller-follower 150 is journaled about a shaft 151 between the upper ends of L-shaped arms 147, and roller-follower 150 is adapted to engage the chamber drive profile 146 of cam 144.

A connecting link 152 is fixed to a shaft 152A which is journaled in frame 23 for rotation, link 152 being adapted to rotate with shaft 152. A pair of drive arms 153, 154 are fixedly mounted at the opposite ends of shaft 152A outside frame 23 (see FIGURE 1). Arms 153, 154 are operatively connected with the opposite sides of brewing chamber 41 in the following manner. A projecting end 155 on arm 153 passes through a slot in runner 48 (see FIGURE 2). Similarly, a projecting end 156 on arm 154 (see FIGURE 1) passes through a slot in runner 46. Thus, when link 152 is pulled upwardly, shaft 152A is pivoted in a clockwise direction (as seen in FIGURE 2), and arms 153, 154 pivot downwardly, thereby moving chamber 41 from its raised to its lowered position, with tongues 47, 49 moving in the corresponding grooves in L-shaped members 45, 45′.

Link 152 is connected to the lower end of L-shaped arms 147 by means of a spring cartridge 157 (see FIGURES 2 and 3). Spring cartridge 157 includes a U-shaped member 158, and connecting link 152 is attached to member 158 at the lower end thereof by means of a pivot pin 159 which passes through the downwardly projecting sides of member 158 and the end of link member 152. A rod 160 has a flattened upper end 161, and a pivot pin 162 passes through the lower end of L-shaped arms 147 and also through end 161 so that rod 160 is pivotally mounted between arms 147. A spacer member 163 is mounted about rod 160 below flattened end 161, and rod 160 passes through the upper end of U-shaped member 158 so that the upper end of U-shaped member 158 abuts against spacer member 163. A coil spring 164 is disposed in U-shaped member 158, and rod 160 passes through the center of spring 164. A spring retainer 165 is fixed to the lower end of rod 160 in a manner such that spring 164 is maintained in a position wherein its upper end abuts against U-shaped member 158. Spring cartridge 157 is provided as the means for interconnecting L-shaped arms 147 and connecting link 152 so that the force transmitted to brewer 41 is varied during the course of the operational cycle, as hereinafter will be explained.

Cam profile 146 is designed so that arms 147 are movable between the rest position shown in FIGURES 1 and 2, corresponding to the raised position of chamber 41, and a clamping position corresponding to the lowered position of chamber 41. Movement of arms 147 from their rest to their clamping positions causes link 152 to pivot upwardly, resulting in clockwise rotation of shaft 152A. Arms 153, 154 are thereby caused to pivot downwardly and, in turn, chamber 41 is caused to move downwardly to its lowered position wherein the knife edge 42 thereof is clamped against filter medium F. The lower ends of arms 147 move a relatively greater distance than does the end of connecting link 152, movement of the latter being limited by the engagement of chamber 41 with filter medium F. As a result, spring 164 is compressed when arms 147 are moved from their rest to their clamping positions. The compression of spring 164 clamps knife edge 42 tightly against filter medium F and semiflexible gasket 92 in top plate 82. In this manner spring cartridge 157, in conjunction with knife edge 42, functions to provide a generally airtight seal at the bottom of chamber 41. Also, knife edge 42 is sufficiently fine to avoid any risk of improper sealing by virtue of a stray coffee ground particle positioned between chamber 41 and filter medium F.

One end of a spring 166 is hooked about pivot pin 159

(see FIGURE 2), and the other end of spring 166 is hooked about a bracket 167 on mechanism frame 23. The function of spring 166 is to return the chamber 41 to its raised position at an appropriate time during the operational cycle of the brewer 21. Spring 166 also serves to maintain roller-follower 150 in constant engagement with cam profile 146. As can be seen from the generally circular configuration of profile 146 shown in FIGURE 2, chamber 41 is maintained in its lowered position throughout a major part of the rotation of cam 144. However, upon completion of the cycle, the roller-follower 150 is pulled into a depressed portion of profile 146 as a result of spring 166 acting on L-shaped arms 147. Connecting link 152 is thereby pivoted in a counterclockwise direction, resulting in chamber 41 moving to its raised position.

It will be obvious to one skilled in the art that coil spring 164 must be more powerful than spring 166. Were this not the case, chamber 41 would be maintained in its raised or rest position even though L-shaped arms 147 pivoted in a clockwise direction about pin 148.

A pair of L-shaped arms 170 are pivoted about a pivot shaft 171, and a spacer 172 also mounted on shaft 171 separates L-shaped arms 170 (see FIGURES 2 and 3). A roller 173 is pivoted between the upper ends of L-shaped arms 170 about a pivot shaft 174. Roller 173 is adapted to move in a slot 175 (shown in broken lines in FIGURE 2), as piston shaft 51 slides downwardly. A spring 175A is stretched between a pin 176, which passes between brackets 177 on L-shaped arms 170, and a bracket 178 on frame 23, thereby urging L-shaped arms 170 toward the position shown in FIGURE 2.

A spring-loaded roller-follower 180 is mounted between the lower ends of L-shaped arms 170, and roller-follower 180 is adapted to contact and engage cam profile 145 on cam 144 (see FIGURES 2 and 3). Roller-follower 180 rotates about a pivot shaft 181, the ends of which are rotatably journaled in a pair of spring-pushing brackets 182. A slot 183 (shown in broken lines in FIGURE 2) is provided in the lower end of each L-shaped arm 170 in a manner such that pivot shaft 181 is slidable between a lowered and various raised positions. A pair of springs 184 are respectively held in a pair of spring-retaining members 185 fixed to L-shaped arms 170, and springs 184 urge brackets 182 downwardly, as shown in FIGURE 2. The purpose for spring loading roller-follower 180 will hereinafter appear.

As cam 144 rotates in a counterclockwise direction (as seen in FIGURE 2), profile 145 acts against roller-follower 180, thereby causing L-shaped arms 170 to pivot in a clockwise direction about shaft 171. Piston 50 is pushed downwardly by means of roller 173 disposed in slot 175 in piston shaft 51, piston 50 being maintained in alignment by means of previously described bearing guides (not shown) which control the downward sliding movement thereof. When roller-follower 180 reaches the return portion of cam profile 145 (indicated by the reference character 186 in FIGURE 2), spring 175A causes counterclockwise movement of L-shaped arms 170 (as seen in FIGURE 2) and pulls piston shaft 51 and piston 50 upwardly. Roller-follower 180 is spring loaded in the previously described manner so as to relieve stress that develops within drive assembly 31 as cam 144 rotates. Thus, as follower 180 passes over return portion 186 of profile 145, roller-follower 180 is pushed upwardly into slots 183 (against the bias of springs 184).

The unlocking, and hence the downward pivotal movement, of coffee transfer chute 60 is controlled by the rotation of cam 144 in the following manner. A vertical locking link 190 (see FIGURES 1 and 8), formed of strip metal or other suitable material, is connected at its lower end to drive arm 153 (the interconnection of the lower end of link 190 and arm 153 is not shown in the drawings). The connection is such that downward movement of arm 153 pulls link 190 downwardly. As best shown in FIGURE 8, a stud 191 is provided on the upper end of link 190, and stud 191 passes through an opening 192 in previously described lever 67. A spring 193 is stretched from stud 191 around the rearward end of lever 67 and is re-anchored to stud 191 on the other side of lever 67. Spring 193 thus urges the stud 191 toward the rear of opening 192. A lobe 194 is formed on the rear surface of opening 192, and as link 190 is moved vertically, stud 191 passes over lobe 194.

Chute 60 is unlocked so that it may move to its lowered position when chamber 41 is moved downwardly by arms 153, 154. Lever 67 is caused to pivot in a counterclockwise direction (as seen in FIGURE 8) by stud 191 which cams against lobe 194 as link 190 is pulled downwardly by arm 153, which, in cooperation with arm 154, moves chamber 41 to its lowered position. However, the counterclockwise movement of lever 67 is only momentary, and the lever 67 returns to its normal position after stud 191 has passed downwardly over lobe 194. Thereafter, when piston 50 moves downwardly, cam surface 72 engages roller-follower 73 and chute 60 is caused to rotate upwardly to its raised position. As this occurs, stud 68 engages the upper end of side 66 and drops into notch 69 when the chute 60 reaches its raised position. In this manner relocking of the chute 60 is accomplished. At the completion of the brew cycle, when chamber 41 moves to its raised position, link 190 is moved upwardly by arm 153, and stud 191 passes upwardly over lobe 194 until it is again disposed above lobe 194 in opening 192.

Cycle control assembly 29 is shown in FIGURE 1. A plurality of conventional rotary timing cams 201, 202, 203, 204 are mounted in a series on shaft 143 for rotation therewith. Motor 140 thus drives the timing cams 201–204 as well as the drive cam 144. Cam 201 is an index cam and, as such, has a profile (not shown) which is adapted to trip a switch (not shown) so as to cut off the supply of electricity to motor 140 at the end of the operational cycle.

Cam 202 has a profile (not shown) adapted to contact a switch (not shown) in a manner such that electricity is supplied to a motor-driven coffee dispensing mechanism (not shown) and to a motor-driven water injector during a predetermined portion of the operational cycle. Thus, cam 202 controls the release of ground coffee into the brewing chamber 41 and, in addition, the injection of pressurized heated water into the chamber 41. Cam 203 trips a switch (not shown) so as to condition the ground coffee dispensing mechanism to release a predetermined extra amount of coffee, in response to individual customer selection, so as to allow extra strong coffee to be brewed.

Cam 204 has a profile (not shown) which is adapted to contact a switch (not shown) in a manner such that electricity is supplied to filter drive motor 119 during a predetermined portion of the operational cycle. Thus, cam 203 controls the movement of filter medium F over top plate 82. The particular arrangement of cams hereinbefore described is in all respects conventional and forms no part of the subject invention, and it will be obvious to one skilled in the art that many other control arrangements may be utilized, as required.

It is preferred that conventional filter paper of an appropriate porosity be used as the filter medium F when the invention is utilized with a tape drawn from a continuous roll. When an endless belt is utilized, a suitable filtering material (such as nylon mesh) may be advantageously utilized.

The operation of the one-cup coffee brewer 21, as controlled by assembly 29, may be described as follows. FIGURES 7–11 schematically illustrate the relative positions of the components of the brewer 21 during the various phases of the brew cycle. Different positions of various parts are also shown in broken lines in FIGURE 2.

FIGURE 7 schematically shows brewing chamber 41 and piston 50 disposed in their normal raised positions. The operation of the brewer 21 is typically commenced by the deposit of coins having at least a predetermined value in a conventional coin-responsive mechanism (not shown). When the coins are deposited, the coin-responsive mechanism is adapted to energize motor 140. Motor 140 imparts rotational movement to drive shaft 143, which, in turn, causes drive cam 144 and timing cams 201–204 to rotate. As cam 144 rotates, profile 146 engages roller-follower 150 and causes L-shaped arms to pivot about shaft 148 in a manner such that chamber 41 is moved by arms 153, 154 to its lowered position. FIGURE 8 schematically illustrates the first stage of the brewing cycle wherein chamber 41 has been moved to its lowered position in which it is clamped against filter medium F and gasket 92 in top plate 82. The chamber 41 is clamped against medium F under tension or pressure because of the operation of previously described spring cartridge 157.

The downward movement of arm 153 also results in chute locking lever 67 being pivoted in a counterclockwise direction as seen in FIGURE 8. Coffee transfer chute 60 is thereby unlocked and is free to move to its lowered position. At this point, rotation of cam 202 trips its associated switch so as to actuate the previously described coffee dispensing mechanism, and a measured charge of ground coffee is released into chute 60 and is thereby directed into the chambre 41, wherein it falls to rest on filter medium F (see FIGURE 8).

As shaft 143 continues to rotate, profile 145 cams against roller-follower 180, and L-shaped arms 170 are pivoted about pivot shaft 171. This causes piston shaft 51 and piston 50 to slide downwardly so as to seal the top opening in chamber 41 as shown in FIGURE 9. As shaft 51 moves downwardly, chute 60 is pivoted to its raised position and is relocked therein as cam surface 72 contacts roller-follower 73 (see FIGURE 8). After piston 50 has sealed the top of chamber 41, profile 145 is configured such that downward motion of piston 50 momentarily is stopped. At this point, the rotation of shaft 143 has caused cam 204 to engage its associated switch, thereby energizing the water pump (not shown). The pump commences to force a predetermined volume of heated water under pressure through delivery tube 55, the check valve (not shown), and port 54, whereby a jet stream of water is directed against the coffee grounds disposed on filter medium F (see FIGURE 9), and the coffee grounds are thus violently agitated. Preferably, the jet stream of water agitates the coffee grounds for a period of approximately one second before continued rotation of drive shaft 143 and cam 144 cause piston shaft 51 and piston 50 to resume their downward movement.

Continued downward movement of piston 50 (see FIGURE 10) increases the pressure within chamber 41 since filter medium F and the coffee grounds tend to resist the passage of brewed coffee from chamber 41 into drain cup 95. Coffee is rapidly brewed in chamber 41 as a result of the simultaneous injection of the jet stream of heated water and the increase in pressure within the system caused by the decreasing effective volume of chamber 41. As piston 50 nears the bottom of its stroke, the water pump stops supplying heated water through tube 55 and the check valve closes. With water no longer being supplied, the piston 50 moves to its bottommost position adjacent the grounds (shown in broken lines in FIGURE 10). As the pressure increases in chamber 41, brewed coffee is forced to flow through filter medium F into drain cup 95, and from there to a delivery area (not shown) through delivery tube 96. All of the brewed coffee is forced through filter medium F before piston 50 reaches its bottommost position so that compressed air is forced through the grounds and through filter medium F during the final portion of the downward stroke. The passage of this air through the grounds and the filter medium drives substantially all the moisture out, thereby leaving only a pod of relatively dry coffee grounds on a relatively dry portion of the filter medium F.

As has hereinbefore been indicated, the provision of water ingress port 54 adjacent the lower edge of chamber 41 is of great importance, since it permits the jet stream of pressurized heated water to be directed at the ground coffee for vigorous agitation thereof. Moreover, with port 54 at the bottom, the jet stream of water may be injected simultaneously with the pressure producing downward stroke of piston 50 in accordance with the novel brewing principle herein disclosed.

After piston 50 reaches its bottommost position, continued rotation of shaft 143 and cam 144 results in the upward movement of chamber 41 and of piston 50 to their respective raised positions (see FIGURE 11), L-shaped arms 147 being pulled by spring 166 and L-shaped arms 170 being pulled by spring 175A. At this point, the profile of cam 204 engages its associated switch, and motor 119 is energized so as to advance filter medium F, in the manner hereinbefore described. Thus, the dry coffee pod and filter medium F are moved from under chamber 41, and a fresh portion of the filter medium F is disposed beneath chamber 41 in preparation for the next brewing cycle.

After piston 50 and chamber 41 have returned to their respective raised positions, and after filter medium F has advanced, continued rotation of shaft 143 results in the profile on index cam 201 tripping its associated switch, resulting in the de-energization of motor 140. Thus, the operational cycle has been completed, and the brewer 21 is disposed in its rest position, ready for reactuation so as to rapidly brew another cup of coffee.

The respective positions of the various parts of unitary drive assembly 31 at the different stages in the brewing operation are shown in FIGURE 2. This disposition of the parts shown in full lines in FIGURE 2 corresponds to the final stage in the brewing process illustrated schematically in FIGURE 11. In the normal rest position, illustrated schematically in FIGURE 7, L-shaped arms 170 have pivoted very slightly in a counterclockwise direction about pivot shaft 171. The positions of roller-follower 180 and roller 173, corresponding to the FIGURE 7 position, are shown in broken lines in FIGURE 2, the parts being indicated by the addition of a single prime notation to the usual reference character. L-shaped arms 170 do not move as the mechanism moves from its normal rest position to the position shown schematically in FIGURE 8. However, chamber 41 moves downwardly during this portion of the operational cycle, corresponding to the movement of roller-follower 150 from the position shown in full lines in FIGURE 2 to the position shown in broken lines in FIGURE 2, indicated by the addition of single prime notation to the usual reference character.

With chamber 41 clamped downwardly against filter medium F, the L-shaped arms 147 remain in the same position throughout the portions of the operational cycle illustrated schematically in FIGURES 9 and 10, and hence roller-follower 150 occupies the position indicated at 150' in FIGURE 2. The stage of the operational cycle, illustrated schematically in FIGURE 9, is reached when piston 50 has moved downwardly so as to seal the top of chamber 41, this disposition of the piston being shown in broken lines and designated by the reference character 50' in FIGURE 2. Roller 173, at this point, is disposed in the position shown in broken lines in FIGURE 2 and designated by the reference character 173". Correspondingly, the roller-follower 180 is located at the broken line position indicated by the reference character 180" in FIGURE 2.

During the next stage of the brewing process schematically shown in broken lines in FIGURE 10, piston 50 has moved to the bottom of chamber 41, thereby forcing the brewed coffee through filter F. This disposition of piston 50 is also shown in broken lines in FIGURE 2 and is designated therein by reference character 50". The respective positions of roller 173 and roller-follower 180, corresponding to this disposition of piston 50, are shown in broken lines in FIGURE 2, and are designated respectively by reference characters 173''' and 180'''. As has hereinbefore been indicated, the disposition of the chamber 41 and piston 50 illustrated schematically in FIGURE 11 corresponds to the respective positions shown in full lines in FIGURE 2.

One advantage of the subject invention is that a relatively dry waste remains at the end of the brewing cycle. This results from the fact that the last portion of the downward stroke of piston 50 forces air through the coffee grounds and filter so as to drive out residual moisture. Instead of wet or soggy grounds remaining at the close of the brewing cycle, there is merely a small pod of relatively dry coffee grounds retained on the filter medium F (see FIGURE 11). The coffee brewer 21 does not, as a result, require the constant servicing that a wet grounds machine requires in order to eliminate the wet waste which is a source of unpleasant odor, and which may contribute to internal malfunctioning in the brewing operation due to its corrosive properties.

As has hereinbefore been indicated, it is preferred that roller-follower 180 be spring loaded in the lower portion of L-shaped arms 170. The reason for this is that torque of an unexpectedly high magnitude is built up within the system during the operational cycle. Specifically, torque is developed within drive assembly 31 during the return portion of the cycle. When roller-follower 180 reaches the return portion 186 of cam profile 145 (see FIGURE 2), torque is actually transmitted back to motor 140 via cam 144, rather than the motor transmitting torque to the cam followers. Sufficient stress is placed on the system, primarily on shaft 143 and on pivot shaft 171, that operation failures are possible or even probable. In order, therefore, to prevent such operational failures, the roller-follower 180 is spring loaded in L-shaped arms 170. The spring loading permits roller-follower 180 to be driven upwardly toward pivot shaft 171 (against the bias of springs 184) as follower 180 passes over return portion 186 on cam profile 145, thereby greatly reducing the magnitude of the torque transmitted back to the motor shaft 143.

As has previously been indicated, it is possible to utilize an endless filter belt instead of the filter tape drawn from a storage roll. A modified structure capable of use with such a belt is shown in FIGURE 12. A filter belt 211 is passed about a pair of rotatable friction drive rollers 212, 213, which are mounted respectively on a pair of shafts 214, 215. Belt 211 is tight enough so that rotation of the drive rollers 212, 213 causes the belt 211 to move. A modified base casting 81' is provided between rollers 212, 213 so that the belt 211 passes over the top of casting 81'. Base casting 81' has an opening in which a drain cup 95' is mounted. Belt 211 passes over the drain cup 95'. A delivery tube 96' leads away from cup 95'. A fixed scraper blade 216 is provided in order to scrape the dry coffee grounds from the belt 211 as it moves away from the brewing chamber (not shown in FIGURE 12). It will be obvious to one skilled in the art that in other respects the functioning of a coffee brewing mechanism embodying the modification shown in FIGURE 12 is similar to the previously described arrangement adapted to operate with a filter tape drawn from a storage roll.

The subject invention provides unique mechanisms for brewing small quantities of coffee in short periods of time. Moreover, the unexpectedly short brewing time is achieved without sacrificing the quality of the coffee brewed (i.e., the coffee brewed is full-bodied and has the flavor and aroma of naturally brewed coffee). This advance over the prior art is believed to result from the utilization of the unique principle embodied in the subject brewing method and mechanisms. According to the subject method, a predetermined charge of ground coffee is disposed within a brewing chamber adjacent a filter medium. A predetermined volume of heated water in a jet stream is introduced into the brewing chamber through an opening adjacent the bottom or lower portion thereof in order to vigorously agitate the charge of ground coffee disposed in the chamber. Pressure is developed within the chamber simultaneously with the injection of the water, and pressure is continued after water injection stops. In addition to contributing to the brewing of coffee of a superior quality in an unusually short period of time, the build-up of pressure in the chamber also provides the impetus necessary to force the brewed coffee through the filter medium so as to efficiently separate the brewed coffee from the coffee grounds.

As will be obvious to one skilled in the art, the subject invention may be utilized for purposes other than brewing coffee, although the brewing of coffee, especially for commercial vending purposes, is the preferred practice of the subject invention. For example, the described apparatus may be adapted for use in the brewing of tea, or for other purposes served by an infusor device.

Obviously, many other modifications and variations of the present invention are possible. It is to be understood that the invention is not limited in its application to the details of construction and arrangement of parts specifically described or illustrated. It should further be understood that various changes, modifications, and alterations may be effected in the parts and elements of the described embodiment, without departing from the spirit and scope of the subject invention, as described in the appended claims.

What is claimed is:

1. An infusor apparatus for brewing coffee or the like comprising:
   chamber means having an outlet opening formed therein;
   filter means cooperable with the chamber means;
   means for placing a charge of infusible material within the chamber means adjacent the filter means;
   means for sealing the infusible material within the chamber means;
   liquid supply means adapted to inject a jet stream of liquid into the infusible material and thereby to cause vigorous agitation thereof; and
   pressurizing means adapted to produce pressure within the chamber means simultaneously with the injection therein of the jet stream of liquid,
   whereby the infusible material is rapidly and thoroughly infused with the liquid and the resulting infusion is discharged from the outlet opening of the chamber means through the filter means.

2. An infusor apparatus for brewing coffee or the like comprising:
   brewing chamber means having an outlet opening formed therein;
   filter means cooperable with the brewing chamber means;
   means for placing a charge of ground coffee within the brewing chamber means adjacent the filter means;
   means for sealing the ground coffee within the brewing chamber means;
   water supply means adapted to forcibly inject a jet stream of heated water into the ground coffee and thereby to cause vigorous agitation thereof; and
   pressurizing means adapted to produce pressure within the brewing chamber means simultaneously with the injection therein of the jet stream of heated water,
   whereby coffee is rapidly and thoroughly brewed within the brewing chamber means and is discharged from the outlet opening thereof through the filter means.

3. An infusor apparatus, as claimed in claim 2, wherein the water supply means is arranged to inject the jet stream of heated water laterally into the ground coffee and the pressurizing means comprises a piston member vertically reciprocable in the brewing chamber means.

4. An infusor apparatus, as claimed in claim 2, wherein the pressurizing means is so arranged as to cause the production of pressure to continue after injection of the water has stopped.

5. An infusor apparatus for brewing coffee or the like comprising:
movable filter means;
brewing chamber means having an outlet opening formed therein and a water ingress opening being provided in said brewing chamber means adjacent the outlet opening, the said brewing chamber means being movable between a first position, wherein the chamber means is disposed away from the filter means, and a second position, wherein the brewing chamber means is clamped against the filter means;
drive means adapted to move the brewing chamber means between its first and second positions;
coffee supply means adapted to release a predetermined charge of ground coffee into the brewing chamber means after it has moved from its first to its second position;
water supply means adapted, after actuation of the coffee supply means, to forcibly inject a predetermined volume of heated water in a jet stream through the water ingress opening in the brewing chamber means onto the charge of ground coffee positioned on the filter means within the brewing chamber means for vigorous agitation of the charge of ground coffee;
means for producing pressure within the brewing chamber means simultaneously with the injection therein of the jet stream of heated water, and for continuing the pressurization of the chamber after injection of the water has ended; and
means for moving the filter means after the brewing chamber means moves from its second to its first position so that another portion of the filter means is disposed adjacent the outlet opening of the brewing chamber means,
whereby coffee is rapidly brewed within the brewing chamber means and is forced therefrom through the filter means so as to leave relatively dry grounds residue on the filter means.

6. An infusor apparatus, as claimed in claim 5, wherein the filter means comprises a filter tape of finite length drawn from a roll supply.

7. An infusor apparatus, as claimed in claim 5, wherein the filter means comprises an endless filter belt.

8. An infusor apparatus for brewing coffee or the like comprising:
a movable filter member;
a brewing chamber member having an inlet opening at one end thereof and an outlet opening at the other end thereof, the brewing chamber member also having a water ingress opening provided adjacent the outlet opening, and the brewing chamber member being reciprocally movable between a first position, wherein the chamber member is disposed away from the filter member, and a second position, wherein the brewing chamber member clamps against the filter member;
a piston member adapted to be moved from a first position, wherein the piston member is disposed away from the brewing chamber member, to a second position, wherein the piston member seals the inlet opening in the brewing chamber member, to a third position, wherein the piston member has moved within the brewing chamber member to a position adjacent the outlet opening therein, and back to its first position, movement of the piston member from its second to its third position being adapted to a continually increase the pressure within the brewing chamber member;
coffee supply means adapted to release a predetermined charge of ground coffee into the brewing chamber member after it is moved from its first to its second position, whereby the ground coffee charge is positioned on the filter member;
water supply means adapted, simultaneously with the movement of the piston member from its second to its third position, to forcibly inject a predetermined volume of heated water in a pressurized jet stream through the water ingress opening in the brewing chamber member onto the charge of ground coffee positioned on the filter member within the brewing chamber member for vigorous agitation of the charge of ground coffee, said water injection terminating prior to the piston attaining its third position;
drive means adapted to move the brewing chamber member from its first to its second position, thereafter to move the piston member from its first to its second position after the release of the charge of coffee into the brewing chamber member, thereafter to move the piston member from its second to its third position simultaneously with the injection of the stream of heated water into the brewing chamber member, and thereafter to move the brewing chamber member from its second to its first position and the piston member from its third to its first position; and
means for moving the filter member after the brewing chamber member moves from its second to its first position so that another portion of the filter member is disposed adjacent the outlet opening of the brewing chamber member,
whereby coffee is rapidly brewed within the brewing chamber member and is forced therefrom through the filter member so as to leave relatively dry grounds residue on the filter member.

9. An infusor apparatus for brewing coffee or the like comprising:
a drain base member having an opening provided therein;
a filter member adapted to be slidably passed over the opening in the drain base member;
a cylindrical brewing chamber provided with an open bottom, an open top, and a water ingress opening in the side thereof in close proximity to the open bottom, the said brewing chamber being adapted for reciprocal vertical movement between a first position, wherein the chamber is disposed away from the filter member, and a second position, wherein the brewing chamber clamps the filter member over the opening in the base member;
a piston adapted for reciprocal vertical movement from a first position, wherein the piston is disposed away from the brewing chamber, to a second position, wherein the piston seals the inlet opening in the brewing chamber, to a third position wherein the piston is disposed adjacent the outlet opening in the brewing chamber, and back to the first position, movement of the piston member from its second to its third position being adapted to continually increase the pressure within the brewing chamber;
coffee supply means adapted to release a predetermined charge of ground coffee to the brewing chamber after it has moved from its first to its second position whereby the ground coffee is positioned on the filter member;
water supply means adapted, simultaneously with the movement of the piston from its second to its third position, to forcibly inject a predetermined volume of heated water in a pressurized jet stream through the water ingress opening in the side of the brewing chamber onto the charge of ground coffee positioned on the filter member at the bottom of the brewing chamber for vigorous agitation of the charge of ground coffee, said water injection terminating prior to the piston attaining its third position;
drive means adapted to move the brewing chamber from its first to its second position, thereafter to move the piston from its first to its second position after the release of the charge of coffee into the brewing chamber, thereafter to move the piston from its second to its third position simultaneously with the injection of the jet stream of heated water through the ingress port in the side of the brewing chamber, and thereafter to move the brewing chamber from its second to its first position and the piston from its third to its first position; and means for moving the filter member after the brewing chamber moves from its second to its first position so that another portion of the filter member is disposed over the opening in the base member, whereby coffee is rapidly brewed within the brewing chamber and is forced therefrom through the filter member and the opening in the base member so as to leave relatively dry grounds residue on the filter member.

10. An infusor apparatus, as claimed in claim 9, wherein the drive means comprises:

piston moving means for imparting reciprocal vertical movement to the piston;

chamber moving means for imparting reciprocal vertical movement to the brewing chamber;

rotatable drive shaft means;

means for causing the drive shaft means to undergo rotation;

cam means mounted on the drive shaft for rotation therewith, the said cam means being provided with a first cam profile and a second cam profile;

first follower means adapted to engage the first cam profile on the cam means, the said first follower means being operatively connected to the piston moving means in a manner such that rotation of the cam means causes the piston to undergo reciprocal vertical movement; and second follower means adapted to engage the second cam profile, the said second follower means being operatively connected to the chamber moving means in a manner such that rotation of the cam means causes the brewing chamber to undergo reciprocal vertical movement, whereby rotation of the cam means results in movement of the piston and the brewing chamber according to a predetermined sequence.

11. An infusor apparatus, as claimed in claim 10, and further comprising means for resiliently mounting at least one of the follower means.

12. In an infusor apparatus for brewing coffee or the like provided with a vertically movable brewing chamber and a vertically movable piston, a synchronized unitary drive mechanism comprising:

piston moving means for imparting reciprocal vertical movement to the piston;

chamber moving means for imparting reciprocal vertical movement to the brewing chamber;

rotatable drive shaft means;

means for causing the drive shaft means to undergo rotation;

cam means mounted on the drive shaft for rotation therewith, the said cam means being provided with a first cam profile and a second cam profile.

first follower means adapted to engage the first cam profile of the cam means, the said first follower means being operatively connected to the piston moving means in a manner such that rotation of the cam means causes the piston to undergo reciprocal vertical movement; and second follower means adapted to engage the second cam profile, the said second follower means being operatively connected to the chamber moving means in a manner such that rotation of the cam means causes the brewing chamber to undergo reciprocal vertical movement, whereby rotation of the cam means results in movement of the piston and the brewing chamber according to a predetermined sequence.

References Cited

UNITED STATES PATENTS

| | | | |
|---|---|---|---|
| 3,019,719 | 2/1962 | Parraga | 99—287 |
| 3,203,340 | 8/1965 | Totten | 99—302 X |
| 3,288,049 | 11/1966 | Schmid et al. | 99—287 X |

FOREIGN PATENTS

| | | |
|---|---|---|
| 1,333,403 | 6/1963 | France. |
| 1,376,189 | 9/1964 | France. |

WILLIAM I. PRICE, *Primary Examiner.*